United States Patent [19]
Lai et al.

[11] Patent Number: 4,794,382
[45] Date of Patent: Dec. 27, 1988

[54] IMAGE RETOUCHING

[75] Inventors: Ching T. Lai; David J. MacKenzie, both of Herts., England

[73] Assignee: Crosfield Electronics Limited, London, England

[21] Appl. No.: 768,607

[22] Filed: Aug. 23, 1985

[30] Foreign Application Priority Data

Sep. 3, 1984 [GB] United Kingdom ............... 8422209

[51] Int. Cl.[4] .............................................. G09G 1/16
[52] U.S. Cl. ..................................... 340/703; 340/725; 358/28; 358/80
[58] Field of Search ............... 340/701, 702, 703, 725, 340/793; 358/28, 75, 78, 80

[56] References Cited

U.S. PATENT DOCUMENTS

| | | | |
|---|---|---|---|
| 4,232,311 | 11/1980 | Agneta | 340/701 |
| 4,393,399 | 7/1983 | Gast et al. | 358/78 |
| 4,516,155 | 5/1985 | Henning et al. | 358/80 |
| 4,554,576 | 11/1985 | Kao | 358/28 |
| 4,577,219 | 3/1986 | Klie et al. | 358/75 |
| 4,598,282 | 7/1986 | Pugsley | 340/703 |
| 4,602,294 | 7/1986 | Yamada | 358/80 |

FOREIGN PATENT DOCUMENTS

0029049 11/1980 European Pat. Off. .

OTHER PUBLICATIONS

Ware Myers–"Computer Graphics: The Human Interface"–IEEE publication–1980–pp. 45–54.
Richard G. Shoup–"Superpaint . . . The Digital Animator"–Society of Motion Picture and Television Engineers–1979–pp. 150–156.
Hale et al–"Desktop Computer Clarifies Graphics with Vivid Color"–Electronic Design publication–May/10/80–pp. 161–166.
Christopher P. Herot–"A Spatial Graphical Man-Machine Interface"–Department of Computer Science University of Manchester U.K.–1980–pp. 1040–1044.

Primary Examiner—Gerald L. Brigance
Assistant Examiner—Mahmoud Fatahiyar
Attorney, Agent, or Firm—Sughrue, Mion, Zinn, Macpeak, and Seas

[57] ABSTRACT

A method and apparatus for electronically retouching an image are described. The apparatus comprises a source (1) of color component image signals representing the color component values for the picture elements of the image to enable the image to be displayed on a monitor screen (8). A source (9) of color data is provided representing the color component values of a first range of colors, adjacent colors differing from each other by more than a predetermined amount. A control device (2) such as a minicomputer causes the monitor screen (8) to display the first range of colors. Operator-control apparatus (3) such as a digitizing table enables the operator to select one of the displayed colors, whereby the control device (2) thereupon causes the monitor screen (8) to display a second range of colors centered on the selected color, adjacent colors of the second range differing from each other by less than the predetermined amount, the operator-control apparatus (3) enabling the operator to select one of the second range of colors. A store (10) is provided for storing data representing the color component values of the selected one of the second range of colors.

12 Claims, 3 Drawing Sheets

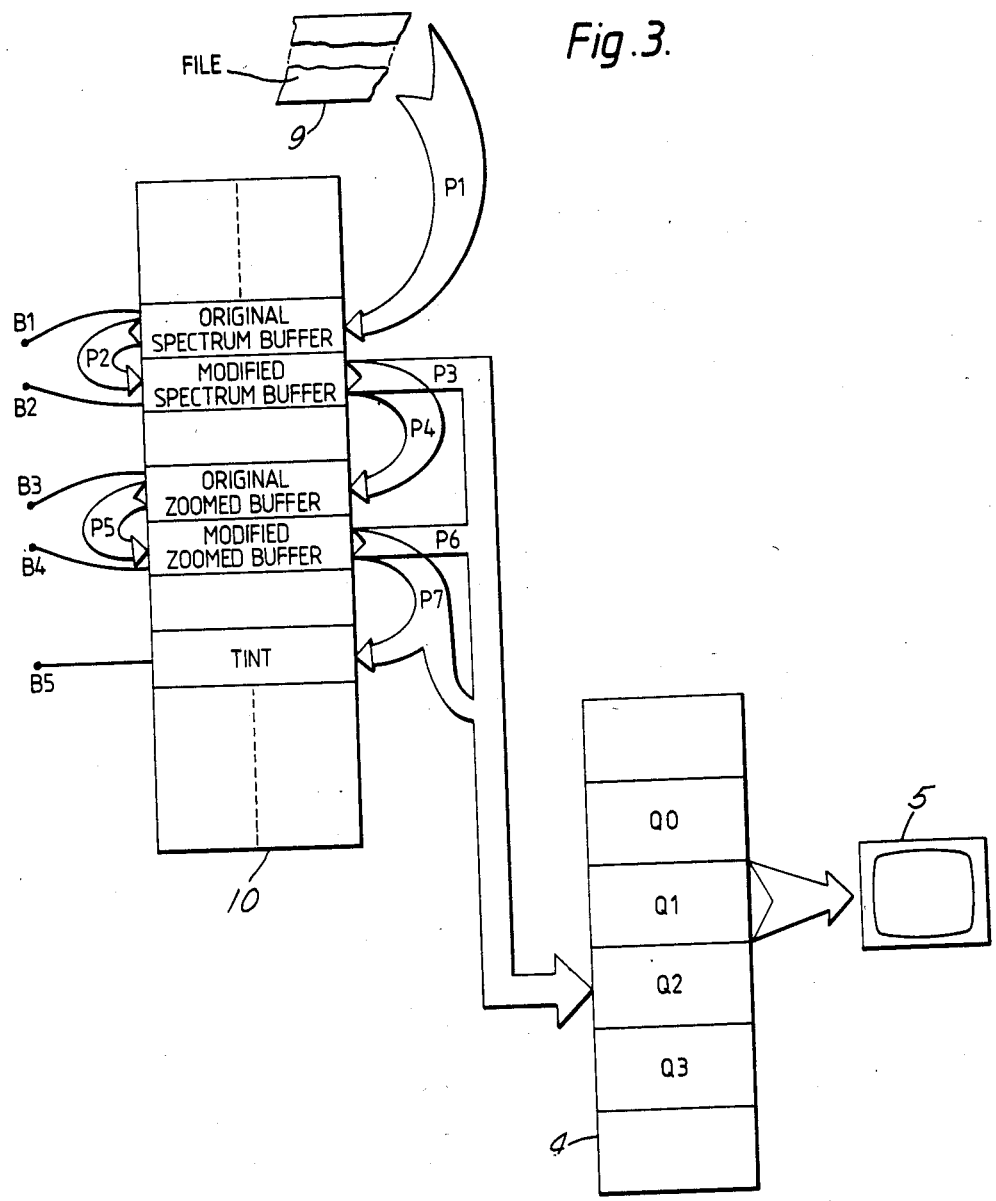

IMAGE RETOUCHING

The invention relates to methods and apparatus for electronically retouching an image.

In conventional electronic scanning systems, an original image is scanned to generate colour component signals representing the colour component values (e.g. densities) of for example cyan, magenta, yellow and black for each picture element of the image. In some cases, the scanned image can immediately be regenerated (in the form of colour separations) but in general a certain amount of retouching must first be carried out. An example of a retouching system is our Stuido 800 Proedit System. One retouching facility which is commonly required is to change the colour or tint of one or more parts of the image. In the past, changes in tint have relied on the expertise of the operator. The retouching system can indicate the colour component values (in the form of percentages of some maximum) constituting the colour of a particular area of the image and the operator then changes one or more of those values, reviews the image with the new tint, and then repeats these steps until the desired tint is achieved. As we have said, this relies on the expertise of the operator to know the effect of changes in colour component values.

One attempt at dealing with this problem is known as the "colour chart" method. A colour chart has a three dimensional form with the three axes representing the percentages of cyan, magenta, and yellow respectively. The colour chart is displayed on the monitor in the form of a number of pages each page representing a different quantity of one of the colour components (e.g. yellow) and including two axes representing the ranges of the other two colour components (magenta and cyan) the area between the axes illustrating the resultant colour achieved by the various different combinations of percentages of the three colour components. when the colour chart is displayed on the monitor, each page of the chart in turn fills the monitor screen. This has the disadvantage that where the operator has to look at a number of different pages before finding the desired tint he may forget the colour of the original image which he wishes to modify. This is particularly important because in general the new tint is similar to the original tint.

An article in Datamation, Vol 25, No 5, pages 150-152 describes a system known as "Superpaint" for the interactive creation and manipulation of simple, cartoon-like graphics and animated imagery. In this system, an operator sees on a first RGB colour monitor the picture on which he is currently working. On another monitor to his left, the operator sees a second picture showing a palette of available colours, a variety of brush shapes and sizes, and icons representing various picture editing operations he can invoke. On an adjacent computer terminal screen to his right, the operator is occasionally prompted or advised with messages.

A range of 15 colours are displayed by the second monitor screen and the hue, saturation, and brightness of these colours can be adjusted by the operator to select a desired colour. The colours displayed are determined in accordance with the percentages of red, green, and blue components corresponding to the phosphors of the colour monitor screen and all combinations of these components can be displayed.

This arrangement is not applicable to solving the problems of the present invention relating to image retouching particularly where the resultant image is to be printed. Firstly, a degree of expertise is required by the operator to know how a particular colour will change when its hue, saturation, or brightness is adjusted. Secondly, the range of colours is displayed on a separate screen from the image, and thirdly a number of the colours which are displayable in the Superpaint system are not printable using conventional printing inks.

An article in Computer, Vol 13, No. 6, pages 45-54 describes a computer graphics system in which a range of colours is displayed along the bottom of a monitor screen for selection by an operator. The problem with this arrangement is that only a limited number of colours, up to 256, are available.

In accordance with one aspect of the present invention, a method of selecting a tint for modifying colour printing data representing part or all of an image displayed on a monitor screen comprises displaying on the monitor screen a first range of colours, adjacent colours differing from each other by more than a predetermined amount; selecting one of the displayed colours; displaying on the monitor screen a second range of colours centered on the selected colour, adjacent colours of the second range differing from each other by less than the predetermined amount; and selecting one of the second range of colours to constitute the selected tint.

This finally selected colour constitutes the selected tint.

This method allows an accurate choice of tint to be achieved by using a two stage process. Firstly, a coarse selection and secondly a fine selection. The necessity for an operator to adjust the individual colour component values is avoided.

The difference between the colours of a range may be defined in a variety of ways. For example, the differences could be defined in terms of the wavelengths on which each colour is centered. Preferably, however, the differences are defined in terms of the colour component percentages constituting each colour. Thus, if a particular colour is constituted by C % cyan, M % magenta, Y % yellow, and K % black then the colour could be defined as:

$$(C+M+Y+K)/4$$

The characteristic by which each colour is quantified is hereinafter referred to as the colour characteristic.

Preferably, the colour characteristics of the first range of colours differ from one another by an amount greater than 5% while the colour characteristics of the colours of the second range of colours differ by less than 5%.

Preferably, the colours in the first and second ranges are substantially pure in the sense that they are each constituted by a small range of wavelengths. Conveniently, in this case, the first and second ranges of colours are substantially equally spaced in wavelength but by different respective amounts so that a spectrum of colours is presented to the operator.

The regions of the monitor screen for displaying both the first and second range of colours are preferably common and formed in a continuous line which is arranged horizontally or vertically to one side of the monitor screen.

Preferably, the method further comprises the step of displaying in a block the finally selected tint. This block may be constituted by some or all of the region for displaying the first and second range of colours.

Conveniently, the method further comprises selectively changing the colour characteristic or other property of one or both of the first and second range of colours as desired in respective predetermined steps. For example, changes in colour intensity may be carried out in relatively large steps (for example 5% steps) on colours in the first range and in relatively small steps (for example 1%) on the second range of colours.

This ability not only to switch from a coarse range of colours to a fine range of colours but also to modify the colours in a range enables a selection to be made from a very large range of colours. Typically, if an initial 128 colours are displayed in the first range then a total of 12,800 colours are available.

It is particularly preferable if the colours in each range are defined in terms of printing colour components, typically cyan, magenta, yellow, and optionally black. This means that all colours displayed (although they will have been converted to monitor format colours before display) are printable using conventional printing inks.

The method may be further refined if the first range of colours itself constitutes a range of colours centered on a colour selected from a previous range of colours differing from each other by an amount greater than that separating the colours of the first range. This principle can be applied to obtain as many levels of fineness as is desired.

In accordance with a second aspect of the present invention, a method of electronically retouching an image displayed on a monitor screen comprises displaying at least a part of the image in an image portion of the monitor screen while carrying out a method according to the one aspect of the invention; determining the colour component values of the selected tint; and modifying a selected portion of the image with the selected tint.

This aspect of the invention enables the operator simultaneously to view on the same monitor screen that part of the image which he wishes to retouch and a selection of tints.

Typically the step of modifying a selected portion of the image comprises copying data representing at least the image portion from one store to another and replacing the data with data corresponding with the selected colour. Alternatively, data representing the selected image portion can simply be replaced by the new data.

In accordance with a third aspect of the present invention, apparatus for electronically retouching an image comprises a source of colour component image signals representing the colour component values for the picture elements of the image to enable the image to be displayed on a monitor; a source of colour data representing the colour component values of a first range of colours, adjacent colours differing from each other by more than a predetermined amount; control means for causing the monitor to display the first range of colours; and operator-control means to enable the operator to select one of the displayed colours, whereby the control means thereupon causes the monitor to display a second range of colours centered on the selected colour, adjacent colours of the second range differing from each other by less than the predetermined amount, the operator-control means enabling the operator to select one of the second range of colours.

Although it would be possible to provide a store to store colour component values for each colour which can constitute one of the second range of colours, it is preferable if the control means calculates from the selected colour in the first range of colours the colour components of at least some of the second range of colours which is to be displayed. For example, the control means can calculate the colour components falling between each adjacent pair of the first range of colours within a small range of the selected one of the first range of colours.

Preferably, all the colours are defined in terms of printing colour components, the apparatus further comprising colour conversion means for converting the colour components to equivalent monitor format colour components prior to display by the monitor. Preferably, the control means causes the monitor to display at least part of the image to be retouched in an image portion of the screen simultaneously with the ranges of colours.

The picture elements of the image to be modified will be selected by the operator in a conventional manner using for example a digitizing table.

An example of a method and apparatus in accordance with the present invention will now be described with reference to the accompanying drawings, in which:

FIG. 3 illustrates the memories of the FIG. 1 apparatus in more detail;

FIG. 4 illustrates the coarse spectrum band;

FIG. 5 illustrates the fine spectrum band; and,

FIG. 6 illustrates the tint band.

Figure 1:
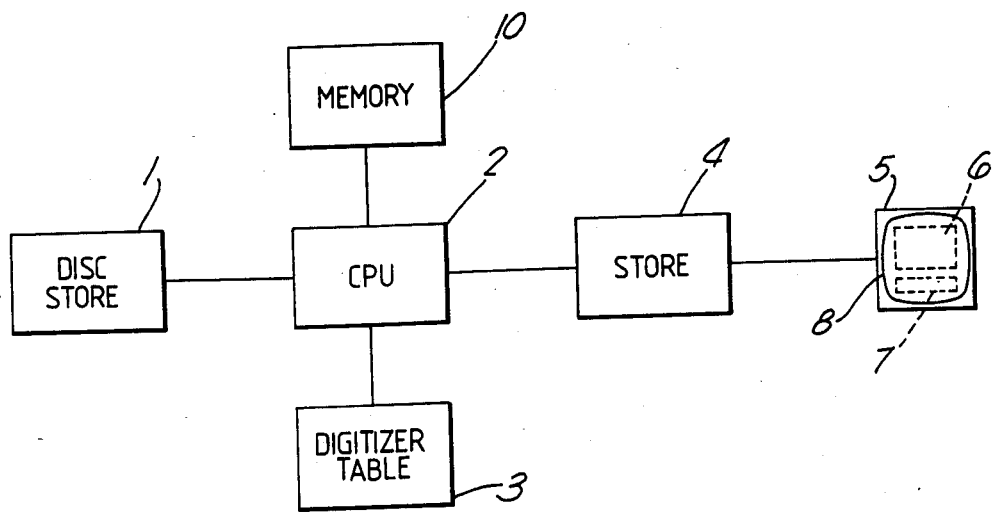
FIG. 1 is a block diagram of the apparatus.

The apparatus shown in FIG. 1 may be based on our Studio 800 Proedit system and comprises a disk store 1 in which is stored digital colour component image signals representing the printing colour component densities of each picture element of an image. This colour component data may have been generated in a conventional manner using an electronic scanning system such as our Magnascan 600 series or have been generated in some other way. The disk store 1 is accessed by a mini computer 2 such as a PDP11 which is controlled via a conventional digitizer table 3. Colour component data is fed from the computer 2 to a colour converter and 6809 memory 4, which inter alia converts the printing colour component data representing the percentages of cyan, magenta, yellow and black in each pixel to monitor format colour component data: red, green and blue. This latter data is fed to a colour monitor 5.

Figure 2:
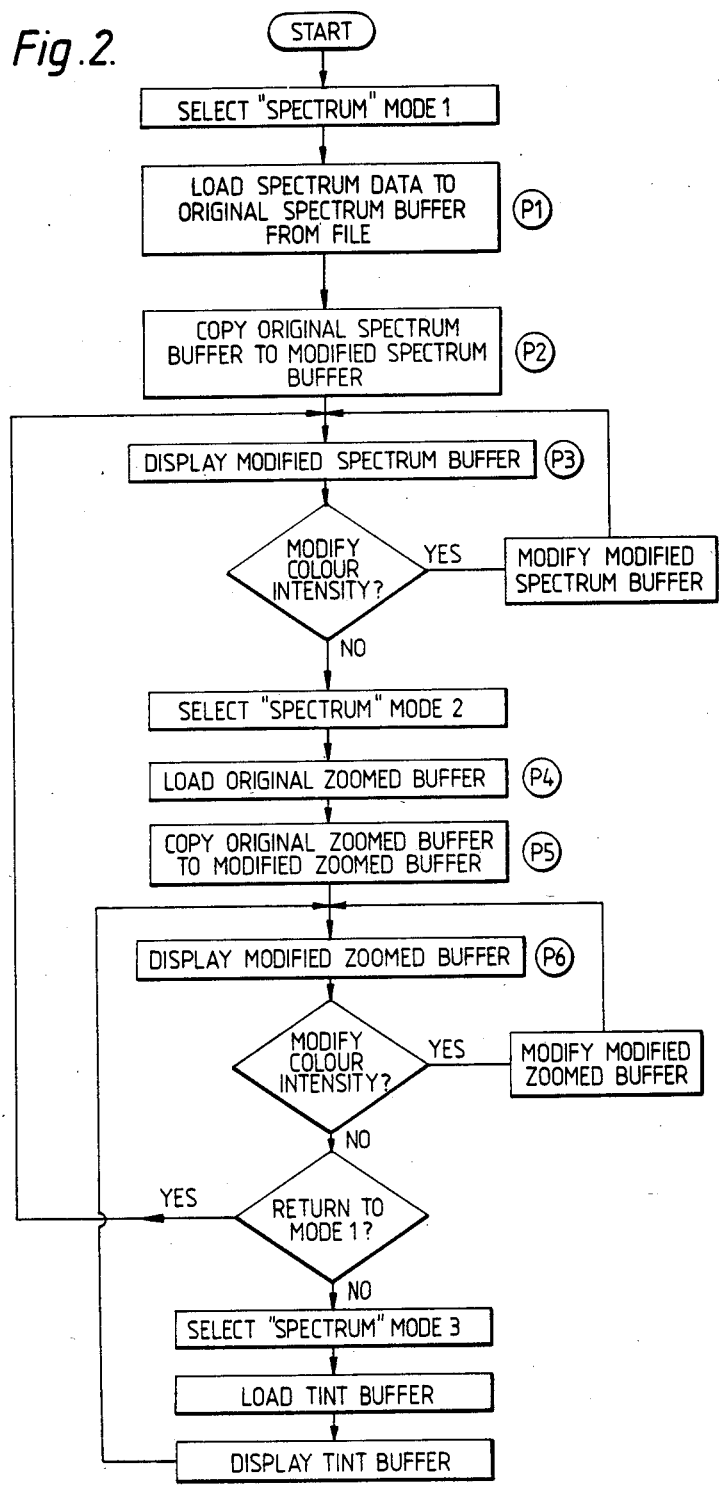
FIG. 2 is a flow diagram illustrating the steps of the method.

When an operator is retouching an image and desires to change the tint of a particular portion of the image he enters the "Spectrum" mode 1 (FIG. 2). In this mode part of the image will be displayed in an image portion 6 of the monitor screen while a first or full range of different colours will be displayed in a window portion 7 of the monitor screen 8.

This full or coarse spectrum comprises 128 substantially pure colours (C1–C128). The coarse spectrum is represented by digital printing colour component values (e.g. densities) stored in a memory 9 of the minicomputer (FIG. 1). When the Spectrum mode 1 is entered, the computer 2 retrieves the coarse spectrum data from the colour data store 9 and loads the data in an Original Spectrum Buffer B1 of a memory 10 of the minicomputer 2. Each buffer of the memory 10 has a size of 512 bytes. Thus, four bytes of the Original Spectrum Buffer B1 are allotted to each of the 128 colours. The contents of the buffer B1 are copied to a Modified Spectrum Buffer B2 and the contents of this buffer B2 are loaded into quadrant Q2 of the 6809 memory 4. Each quadrant in the 6809 memory 4 is made up of 512 lines X 512 bytes and so the Modified Spectrum buffer B2 is copied thirty times into lines 1-30 of the quadrant Q2 to form a Spectrum band. A mask is set up in a conventional manner to define a window which at this stage allows lines 1-30 of quadrant Q2 to be duplicated in quadrant Q1 via a colour converter. The contents of quadrant Q1 are displayed on the monitor 5 in the window portion 7 (FIG. 4). The operator can then view the spectrum band in conjunction with the image portion to be modified on the monitor 5.

The operator then reviews the displayed spectrum and may wish to change the colour intensity of the displayed colours. The change in colour intensity corresponds to the same percentage change being applied to each of the colour components of each colour displayed. For example, if one of the displayed colours (e.g. C20) has colour component densitites in terms of dot sizes of C:10% M:31% and Y:52% then an increase in colour intensity of 5% will change the dot sizes of this particular colour to C:15%, M:36%, and Y:57% whereas a decrease of 5% will change the dot sizes to C:5%, M:26%, and Y:47%. This percentage change is applied to all the colours in the coarse spectrum. If in making this change the resultant colour component percentage exceeds 100% or is less than 0% then the colour component value is set to 100% or 0% respectively.

To modify the colour intensity, the operator depresses a button on the digitizer table 3, each depression causing a 5% change in the colour intensity. These changes are effected via the CPU 2 which directly modifies the data in the Modified Spectrum Buffer B2. The modified data is then loaded from the buffer B2 into the 6809 memory 4 as before and displayed. If the operator finds that he has requested too many colour intensity changes, the data in the Original Spectrum Buffer B1 is recopied into the Modified Spectrum Buffer B2 and the operator restarts the colour intensity change procedure.

Once the operator has changed the colour intensity by a desired amount he then uses a cursor (not shown) in conjunction with the digitizer table 3 to indicate the colour which most closely corresponds to the tint which he desires. For the sake of this example, he may select the colour indicated by $C_{50}$. Once a colour has been selected, mode 2 is entered (FIG. 2).

On entering mode 2, sixteen colours are selected from the Modified Spectrum buffer corresponding to the seven colours on the left of the target colour $C_{50}$ and the eight colours on the right of the target. Thus, the colours labelled $C_{43}$ to $C_{58}$ inclusive will be selected. For each consecutive pair of these colours the computer 2 averages the colour component values of each colour pair to produce an intermediate colour. The sixteenth intermediate colour is produced from the sixteenth and the seventeenth (not used) colour. This produces a total of 32 colours ($Z_1$-$Z_{32}$) which are stored in an Original Zoomed Buffer B3.

The Original Zoomed Buffer B3 is copied to a Modified Zoomed Buffer B4, the contents of which are then loaded into the quadrant Q2 of the 6809 memory 4. In this case, the Modified Zoomed Buffer B4 is copied thirty times into lines 31-60 of the quadrant Q2 to define a zoomed band. The mask associated with the quadrant Q2 is adjusted so that the window enables lines 31-60 to be displayed on the colour monitor 5. Since there are only 32 colours in the zoomed band, each colour occupies a width of 16 bytes as illustrated in FIG. 5.

Once again, the colour intensity of the tints (ie. the colour component values) in the Modified Zoomed Buffer B4 can be increased or decreased in steps but in this case smaller steps of 1%. After each change the contents of the Modified Zoomed Buffer are loaded into the 6809 memory 4 and displayed.

The operator then moves the cursor in the same way as before to select one of the colours in the zoomed band. On selecting a colour, mode 3 is entered (FIG. 2).

In mode 3, the tint values (or colour component values) of the selected colour (eg. Z10) are retrieved by the computer 2 and are loaded into each byte of a tint buffer B5. The contents of the tint buffer are loaded into lines 61-90 of quadrant Q2 of the 6809 memory 4. The mask is adjusted so that after colour conversion the selected colour is displayed across the entire window 7 of the monitor screen (FIG. 6). This enables the operator clearly to see the colour which he has selected.

The tint values corresponding to the selected colour can then be stored in the memory 10 for later recall. Furthermore, the final display of the selected tint illustrated in FIG. 6 can be adjusted in width to a smaller number of pixels and then be effectively moved in a known manner over the image portion 6 of the monitor screen to enable the operator visually to compare the selected tint with the original tint.

Once the operator is satisfied with the selected tint, he exits Spectrum mode via Mode 2 and Mode 1 and instructs the computer 2 to modify the data stored in the disk store 1 accordingly in a conventional manner. The modified image can then be displayed on the monitor screen. (In an alternative method, the operator can cause an image to be modified while in Mode 3).

If the operator finds in Mode 2 or Mode 3 that the colour or colours presented are not satisfactory he can return to the previous mode as illustrated in FIG. 2.

In FIG. 2, the labels P1-P6 refer to the paths shown in FIG. 3.

Conveniently, once "Spectrum" mode has been selected, the operator can use the buttons already provided by the digitizer with their functions modified. For example, where our Studio 800 Proedit system is used, the button functions may be modified as follows:

| Conventional Function | Modified Function |
|---|---|
| Mode 1 | |
| White | Move Cursor |
| Red | Decrease colour intensity in 5% steps |
| Green | Increase colour intensity in 5% steps |
| Yellow | Enter Mode 2 |
| Blue | Exit "Spectrum" Mode |
| Mode 2 | |
| White | Move Cursor |
| Red | Decrease colour intensity in 1% steps |
| Green | Increase colour intensity in 1% steps |
| Yellow | Enter Mode 3 |
| Blue | Return to Mode 1 |
| Mode 3 | |
| White | Scrolls tint band |
| Red | Reduces band width by 1/16 max width per press |
| Green | Saves selected tint values in Tint File |
| Yellow | Displays selected tint values on VDU |
| Blue | Return to Mode 2 |

We claim:

1. A method of selecting a tint for modifying colour printing data representing part or all of an image displayed on a monitor screen, the method comprising displaying on said monitor screen part or all of an image to be modified, and during said displaying step displaying on said monitor screen, in a region different from that of said image to be modified, a first range of colours, adjacent colours within said first range differing from each other by more than a predetermined amount, selecting one of said displayed colours; displaying on said monitor screen, in a region different from that of said image to be modifed, a second range of colours wherein said selected colour is in a middle portion of said second range, adjacent colours of said second range differing from each other by less than said predetermined amount; and selecting one of said second range of colours to constitute said selected tint.

2. A method according to claim 1, wherein the colour characteristics of said first range of colours differ from one another by an amount greater than 5% while the colour characteristics of said colours of said second range of colours differ by less than 5%.

3. A method according to claim 1, wherein said first and second ranges of colours are displayed in the same region of said monitor screen.

4. A method according to claim 1, further comprising the step of displaying in a block said finally selected one of said second range of colours.

5. A method according to claim 1, further comprising selectively changing the colour characteristic of each of the colours in at least one of said first and second range of colours as desired in respective predetermined steps.

6. A method according to claim 5, wherein changes in colour intensity are carried out in relatively large steps on colours in said first range and in relatively small steps on said second range of colours.

7. A method according to claim 1, wherein said colours in each said range are defined in terms of printing colour components.

8. A method according to claim 1, further comprising storing data representing the colour component values corresponding to said selected one of said second range of colours.

9. A method of electronically retouching an image displayed on a monitor screen having an image portion, the method comprising displaying at least a part of said image in said image portion of said monitor screen; during said displaying step, displaying on said monitor screen, in a region different from that of said image portion, a first range of colours, adjacent colours within said first range differing from each other by more than a predetermined amount; selecting one of said displayed colours; displaying on said monitor screen in a region different from that of said image a second range of colours wherein said selected colour is in a middle portion of said second range, adjacent colours of said second range differing from each other by less than said predetermined amount; selecting one of said second range of colours to constitute said selected tint; determining the colour component values of said selected tint; and modifying a selected portion of said image with said selected tint.

10. Apparatus for electronically selecting a tint for retouching an image, the apparatus comprising a monitor; a source of colour component image signals representing the colour component values for the picture elements of said image to enable said image to be displayed in an image portion of said monitor; a source of colour data representing the colour component values of a first range of colours, adjacent colours within said first range differing from each other by more than a predetermined amount; control means for causing said monitor to display said first range of colours in a region different from that of said image portion while said image is displayed; and operator-control means to enable the operator to select one of said displayed colours, whereby said control means thereupon causes said monitor to display, in a region different from that of said image portion while said image is displayed, a second range of colours wherein said selected colour is in a middle portion of said second range, adjacent colours of said second range differing from each other by less than said predetermined amount, said operator-control means enabling the operator to select one of said second range of colours.

11. Apparatus according to claim 10, wherein said control means calculates from said selected colour in said first range of colours the colour components of at least some of said second range of colours which is to be displayed.

12. Apparatus according to claim 10, further comprising a store for storing data representing the colour component values of said selected one of said second range of colours.

* * * * *